UNITED STATES PATENT OFFICE.

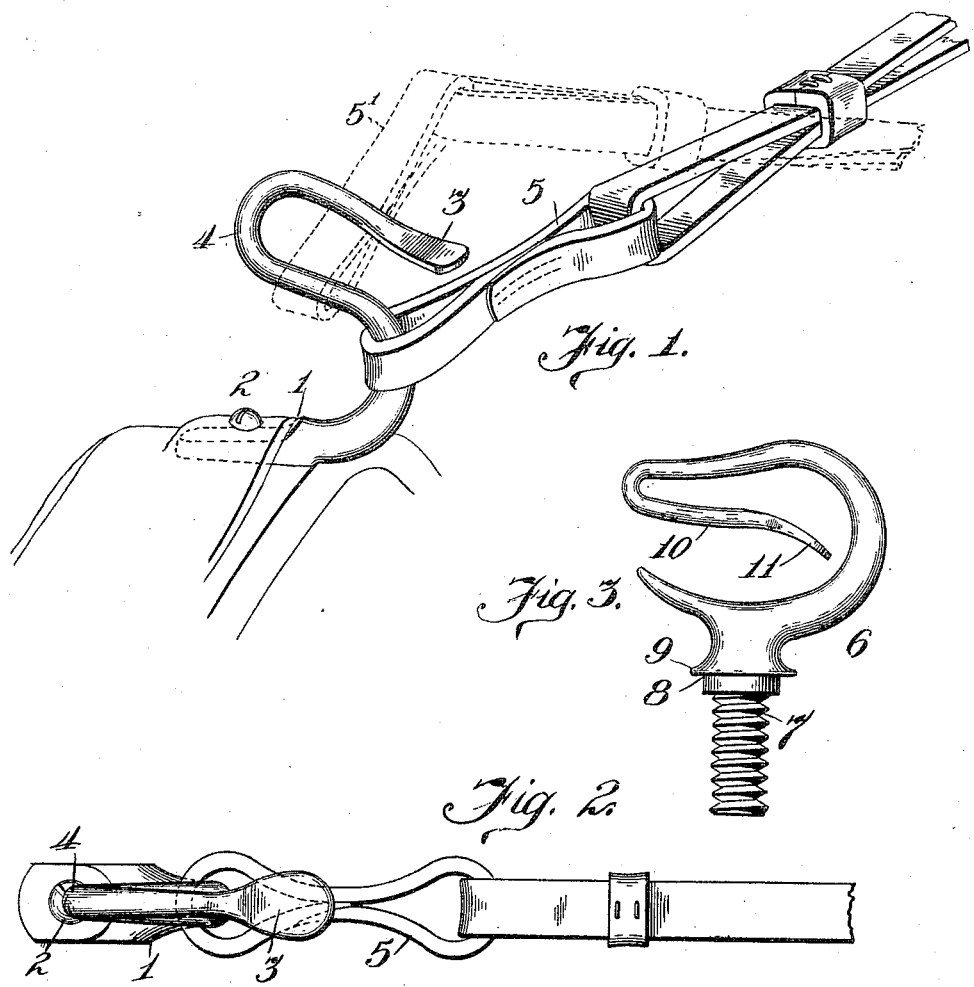

JOHN C. AVERILL, OF CHICAGO, ILLINOIS.

CHECKREIN-HOOK FOR HARNESS.

964,603.  Specification of Letters Patent.  Patented July 19, 1910.

Application filed February 15, 1909. Serial No. 477,930.

*To all whom it may concern:*

Be it known that I, JOHN C. AVERILL, a citizen of the United States, residing at Chicago, in the county of Cook and State of Illinois, have invented certain new and useful Improvements in Checkrein-Hooks for Harness, of which the following is a specification.

This invention relates to an improved check rein hook, and it has for its salient objects to provide a hook which is so shaped as to very effectually prevent the accidental disengagement of the check rein therefrom while enabling the rein to be hooked thereon with the greatest facility; to provide a construction which enables the check rein to be engaged with the hook with a minimum amount of slack left for effecting such engagement; to provide a construction which is extremely neat and graceful in appearance while at the same time strong and susceptible of being cheaply manufactured; and in general to provide an improved hook of the character referred to.

To the above ends the invention consists in the matters hereinafter described, and more particularly pointed out in the appended claims.

In the drawing—Figure 1 is a perspective view of a fragmentary portion of a harness back pad with one of my improved hooks attached thereto; the end portion of the check rein being also shown attached to the hook; Fig. 2 is a top plan view of the parts shown in Fig. 1; Fig. 3 is a side elevation of a modified form of hook.

In forming the hook of my invention, I shape the latter very much in the shape of a swan's neck; the free end of the hook being directed forwardly, and being broadened out somewhat in the shape of a spoon, so as to overhang that portion of the hook which is normally engaged by the check rein, in position to prevent the disengagement of the latter should the tension of the check rein be loosened and the latter allowed to flap around.

Describing the parts more specifically, 1 designates the base end of the hook, which may be secured to the back pad or saddle iron of the harness in any suitable manner, as for example by means of a screw 2 inserted through a flattened portion of the base of the hook and into the saddle iron. From the base end the hook preferably tapers slightly throughout its length to a point near its end, where it is preferably broadened into the flattened or spoon-shaped portion 3. Roughly speaking, the hook as a whole is of S-shape, but I prefer to make the upper terminal portion extend from the upper rear bend 4 in an inclined downwardly and forwardly direction, as shown clearly in the drawing, so that the flattened portion 3 is located only a short distance above the check rein loop 5 when the latter is under tension. I have found in practice that this construction very reliably prevents the check rein from becoming accidentally unhooked, even though the horse be very loosely reined and has the habit of throwing his head around and back in a manner tending to dislodge or unhook the check rein. As the check rein tension is released and tends to buckle up, it encounters the spoon-shaped end of the hook and is held from rising farther. Should the strap be twisted around to one side, as indicated in dotted lines at 5′, it is nevertheless prevented from being dislodged by the upper part of the hook in an obvious manner.

By reason of the fact that the free end of the hook is pointed forwardly, its end may, of course, be entered when applying the loop with the utmost ease, because the check rein is at this time slack, and in order to complete the hooking on of the check rein it is only necessary to have enough slack to enable the loop to be carried back over the bend 4, and this is considerably less than is required with most hooks now in use.

It will be obvious that the hook may be somewhat differently shaped and constructed without departing from the spirit of the invention. For example, in Fig. 3 I have shown a modified construction, in which figure 6 designates as a whole the hook, provided in this instance with a screw-threaded shank 7 of that form which is generally employed in connection with "double" harness. That is to say, the threaded part of the shank is connected with a cylindric portion 8 which fits within a suitable socket formed in the saddle iron, and a flange 9 serves to limit such insertion.

The hook, as in the previously described instance, is provided with a forwardly returned terminal portion 10, but in this instance instead of being bent upwardly and returned forwardly it is bent downwardly and returned forwardly inside the main bowl of the hook, and, as before, terminates in a flattened portion 11. In this construction the terminal portion 11 serves the same general purpose as in the first described construction, viz: of preventing the rein or rein loop from becoming accidentally disengaged from the hook.

I claim as my invention:

1. A check-rein hook, comprising a base portion, an upstanding main hook portion immediately connected with the base, having its convex side forward and prolonged at its upper side rearwardly a substantial distance, and a forwardly returned terminal portion approximately paralleling the rearwardly extending upper side of the main hook portion and terminating in a slightly down-curved end portion.

2. In a single piece check-rein hook, an approximately S-shaped body member, the upper terminal portion of which is inclined downwardly and forwardly toward its free end and is there flattened or widened in order to more effectually confine the check-rein loop upon the hook.

3. A single piece check rein hook, comprising a substantially horizontal base portion, an upstanding main hook portion for receiving the rein immediately connected to the base portion, having its convex side forward and prolonged rearwardly at its upper side a considerable distance so as to substantially parallel the base portion, and a forwardly returned terminal portion approximately paralleling the rearwardly extending upper side of the main portion and terminating in a flattened or broadened end portion.

JOHN C. AVERILL.

Witnesses:
ALBERT H. GRAVES,
EMILIE ROSE.